(12) United States Patent
Rother et al.

(10) Patent No.: US 8,422,769 B2
(45) Date of Patent: Apr. 16, 2013

(54) IMAGE SEGMENTATION USING REDUCED FOREGROUND TRAINING DATA

(75) Inventors: Carsten Curt Eckard Rother, Cambridge (GB); Toby Sharp, Cambridge (GB); Andrew Blake, Cambridge (GB); Vladimir Kolmogorov, Harrow (GB)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 12/718,321

(22) Filed: Mar. 5, 2010

(65) Prior Publication Data

US 2011/0216965 A1 Sep. 8, 2011

(51) Int. Cl.
*G06K 9/62* (2006.01)

(52) U.S. Cl.
USPC ........... 382/159; 382/162; 382/166; 382/167; 382/173; 382/190

(58) Field of Classification Search ................... 382/159, 382/173, 162, 166, 167, 190, 199; 358/453, 358/538, 1.15, 1.16; 348/43, 169
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |

(Continued)

FOREIGN PATENT DOCUMENTS

| | | |
|---|---|---|
| CN | 201254344 | 6/2010 |
| EP | 0583061 | 2/1994 |

(Continued)

OTHER PUBLICATIONS

"3.18. Stroke Path". retrieved on Dec. 4, 2009 at <<http://docs.gimp.org/en/gimp-path-stroke.html>>, 2009, pp. 1-3.

(Continued)

*Primary Examiner* — Ali Bayat
(74) *Attorney, Agent, or Firm* — Zete Law, P.L.L.C.; MacLane C. Key

(57) ABSTRACT

Methods of image segmentation using reduced foreground training data are described. In an embodiment, the foreground and background training data for use in segmentation of an image is determined by optimization of a modified energy function. The modified energy function is the energy function used in image segmentation with an additional term comprising a scalar value. The optimization is performed for different values of the scalar to produce multiple initial segmentations and one of these segmentations is selected based on predefined criteria. The training data is then used in segmenting the image. In other embodiments further methods are described: one places an ellipse inside the user-defined bounding box to define the background training data and another uses a comparison of properties of neighboring image elements, where one is outside the user-defined bounding box, to reduce the foreground training data.

20 Claims, 14 Drawing Sheets

U.S. PATENT DOCUMENTS

| | | |
|---|---|---|
| 4,893,183 A | 1/1990 | Nayar |
| 4,901,362 A | 2/1990 | Terzian |
| 4,925,189 A | 5/1990 | Braeunig |
| 5,101,444 A | 3/1992 | wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein, Jr. |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,900,953 A | 5/1999 | Bottou et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,151,025 A | 11/2000 | Yen et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,337,925 B1 | 1/2002 | Cohen et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 6,987,535 B1 | 1/2006 | Matsugu et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,992 B2 | 7/2006 | Greiffenhagen et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,319,836 B2 | 1/2008 | Kuroda |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,430,339 B2 | 9/2008 | Rother et al. |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,589,721 B2 | 9/2009 | Lorenz |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,606,417 B2 | 10/2009 | Steinberg et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |

| | | | |
|---|---|---|---|
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,778,439 | B2 | 8/2010 | Kondo et al. |
| 7,809,167 | B2 | 10/2010 | Bell |
| 7,834,846 | B1 | 11/2010 | Bell |
| 7,852,262 | B2 | 12/2010 | Namineni et al. |
| 7,860,311 | B2 | 12/2010 | Chen et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,155,405 | B2 * | 4/2012 | Unal et al. .......... 382/128 |
| 8,165,369 | B2 | 4/2012 | Kubota et al. |
| 8,170,350 | B2 | 5/2012 | Steinberg et al. |
| 2003/0184815 | A1 | 10/2003 | Shiki et al. |
| 2004/0202369 | A1 | 10/2004 | Paragios |
| 2005/0271273 | A1 | 12/2005 | Blake et al. |
| 2007/0081710 | A1 | 4/2007 | Hong et al. |
| 2007/0122039 | A1 | 5/2007 | Zhang et al. |
| 2007/0211940 | A1 | 9/2007 | Fluck et al. |
| 2007/0237393 | A1 | 10/2007 | Zhang et al. |
| 2008/0026838 | A1 | 1/2008 | Dunstan et al. |
| 2008/0152231 | A1 | 6/2008 | Gokturk et al. |
| 2008/0260247 | A1 | 10/2008 | Grady et al. |
| 2008/0304698 | A1 | 12/2008 | Rasmussen et al. |
| 2009/0033683 | A1 | 2/2009 | Schiff et al. |
| 2009/0060333 | A1 | 3/2009 | Singaraju et al. |
| 2009/0060334 | A1 | 3/2009 | Rayner |
| 2009/0315978 | A1 * | 12/2009 | Wurmlin et al. .......... 348/43 |
| 2010/0104163 | A1 | 4/2010 | Li et al. |
| 2011/0254950 | A1 * | 10/2011 | Bibby et al. .......... 348/135 |

FOREIGN PATENT DOCUMENTS

| | | |
|---|---|---|
| JP | 08044490 | 2/1996 |
| WO | W09310708 | 6/1993 |
| WO | WO 9717598 | 5/1997 |
| WO | W09944698 | 9/1999 |
| WO | WO2009093146 A1 | 7/2009 |
| WO | WO2009101577 A2 | 8/2009 |

OTHER PUBLICATIONS

Garain, et al., "On Foreground-Background Separation in Low Quality Color Document Images", retrieved on Dec. 3, 2009 at http://l3iexp.univ-lr.fr/madonne/publications/garain2005a.pdf, IEEE Computer Society, Proceedings of International Conference on Document Analysis and Recognition (ICDAR), 2005, pp. 585-589.

Hertzmann, "Stroke-Based Rendering", retrieved on Dec. 3, 2009 at <<http://www.dgp.toronto.edu/~hertzman/sbr02/hertzmann-sbr02.pdf>>, Recent Advances in NPR for Art and Visualization, SIGGRAPH, vol. 3, 2002, pp. 1-31.

Kang, et al., "A Unified Scheme for Adaptive Stroke-Based Rendering", retrieved on Dec. 3, 2009 at <<http://www.cs.umsl.edu/~kang/Papers/kang_tvc06.pdf>>, Springer Berlin, The Visual Computer, vol. 22, No. 9-11, Sep. 2006, pp. 814-824.

Kolmogorov, et al., "Applications of parametric maxflow in computer vision", IEEE International Conference on Computer Vision (ICCV), Rio de Janeiro, BR, Oct. 2007, pp. 1-8.

Lempitsky, et al., "Image Segmentation with a Bounding Box Prior", IEEE International Conference on Computer Vision (ICCV), Kyoto, JP, 2009, pp. 1-8.

Liu, et al., "Paint Selection", retrieved on Dec. 3, 2009 at <<http://yuwing.kaist.ac.kr/courses/CS770/reading/PaintSelection.pdf>>, ACM, Transactions on Graphics (TOG), vol. 28, No. 3, Article 69, Aug. 2009, pp. 1-7.

Lu, et al., "Dynamic Foreground/Background Extraction from Images and Videos using Random Patches", retrieved on Dec. 3, 2009 at <<http://books.nips.cc/papers/files/nips19/NIPS2006_0103.pdf>>, Conference on Neural Information Processing Systems (NIPS), 2006, pp. 351-358.

Mannan, "Interactive Image Segmentation", retrieved on Dec. 2, 2009 at <<http://www.cs.mcgill.ca/~fmanna/ecse626/InteractiveImageSegmentation_Report.pdf>>, McGill University, Montreal, CA, Course ECSE-626: Statistical Computer Vision, 2009, pp. 1-5.

Mortensen, et al., "Intelligent Selection Tools", retrieved on Dec. 4, 2009 at <<http://web.engr.oregonstate.edu/~enm/publications/CVPR_00/demo.html>>, IEEE Proceedings of Conference on Computer Vision and Pattern Recognition (CVPR), Hilton Head Island, SC, vol. 2, 2000, pp. 776-777.

Protiere, et al., "Interactive Image Segmentation via Adaptive Weighted Distances", retrieved on Dec. 2, 2009 at <<http://citeseerx.ist.psu.edu/viewdoc/download?doi=10.1.1.97.776&rep=rep1&type=pdf>>, IEEE Proceedings of Conference on Computer Vision and Pattern Recognition (CVPR), New York, NY, Aug. 2006, pp. 160-167.

Tan, et al., "Selecting Objects With Freehand Sketches", retrieved on Dec. 3, 2009 at <<http://citeseerx.ist.psu.edu/viewdoc/download?doi=10.1.1.83.4105&rep=rep1&type=pdf>>, IEEE Proceedings of International Conference on Computer Vision (ICCV), Vancouver, CA, vol. 1, Jul. 2001, pp. 337-345.

Vicente, et al., "Joint optimization of segmentation and appearance models", IEEE International Conference on Computer Vision (ICCV), Kyoto, JP, Oct. 2009, pp. 1-8.

Aggarwal et al., "Human Motion Analysis: A Review", IEEE Nonrigid and Articulated Motion Workshop, 1997, University of Texas at Austin, Austin, TX.

Azarbayejani et al., "Visually Controlled Graphics", Jun. 1993, vol. 15, No. 6, IEEE Transactions on Pattern Analysis and Machine Intelligence.

Breen et al., "Interactive Occlusion and Collusion of Real and Virtual Objects in Augmented Reality", Technical Report ECRC-95-02, 1995, European Computer-Industry Research Center GmbH, Munich, Germany.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

Freeman et al., "Television Control by Hand Gestures", Dec. 1994, Mitsubishi Electric Research Laboratories, TR94-24, Caimbridge, MA.

Granieri et al., "Simulating Humans in VR", The British Computer Society, Oct. 1994, Academic Press.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

He, "Generation of Human Body Models", Apr. 2005, University of Auckland, New Zealand.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

"Interactive Simulation and Training", 1994, Division Incorporated, 6 pages.

Isard et al., "CONDENSATION—Conditional Density Propagation for Visual Tracking", 1998, pp. 5-28, International Journal of Computer Vision 29(1), Netherlands.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Kohler, "Special Topics of Gesture Recognition Applied in Intelligent Home Environments", In Proceedings of the Gesture Workshop, 1998, pp. 285-296, Germany.

Kohler, "Technical Details and Ergonomical Aspects of Gesture Recognition applied in Intelligent Home Environments", 1997, Germany.

Kohler, "Vision Based Remote Control in Intelligent Home Environments", University of Erlangen-Nuremberg/Germany, 1996, pp. 147-154, Germany.

Livingston, "Vision-based Tracking with Dynamic Structured Light for Video See-through Augmented Reality", 1998, University of North Carolina at Chapel Hill, North Carolina, USA.

Miyagawa et al., "CCD-Based Range Finding Sensor", Oct. 1997, pp. 1648-1652, vol. 44 No. 10, IEEE Transactions on Electron Devices.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Qian et al., "A Gesture-Driven Multimodal Interactive Dance System", Jun. 2004, pp. 1579-1582, IEEE International Conference on Multimedia and Expo (ICME), Taipei, Taiwan.

Rosenhahn et al., "Automatic Human Model Generation", 2005, pp. 41-48, University of Auckland (CITR), New Zealand.

Shao et al., "An Open System Architecture for a Multimedia and Multimodal User Interface", Aug. 24, 1998, Japanese Society for Rehabilitation of Persons with Disabilities (JSRPD), Japan.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Virtual High Anxiety", Tech Update, Aug. 1995, pp. 22.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Zhao, "Dressed Human Modeling, Detection, and Parts Localization", 2001, The Robotics Institute, Carnegie Mellon University, Pittsburgh, PA.

Office action for U.S. Appl. No. 12/718,232, mailed on Jun. 22, 2012, Rother et al, "Up-Sampling Binary Images for Segmentation", 11 pages.

\* cited by examiner

IMAGE SEGMENTATION USING REDUCED FOREGROUND TRAINING DATA

BACKGROUND

A number of techniques have been proposed to enable extraction of the foreground from an image, for example, the extraction of a person from a digital image showing the person standing in front of a scenic view. This process of splitting an image into the foreground and background is known as image segmentation. Image segmentation comprises labeling image elements (such as pixels, groups of pixels, voxels or groups of voxels) as either a foreground or a background image element. This is useful in digital photography, medical image analysis, and other application domains where it is helpful to find a boundary between an object in the image and a background. The extracted object and the background may then be processed separately, differently, etc. For example, in the case of a medical image it may be appropriate to segment out a region of an image depicting a tumor or organ such as the lungs in order to enable a surgeon to interpret the image data.

Dependent upon the technique used, the amount of user input that is involved to achieve the segmentation can vary significantly and in some systems a user traces the approximate outline of the object to be extracted. In other systems, the user draws a box on the image which contains the object of interest. This box is used to specify foreground and background training data which can then be used in segmenting the image.

The embodiments described below are not limited to implementations which solve any or all of the disadvantages of known image segmentation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of image segmentation using reduced foreground training data are described. In an embodiment, the foreground and background training data for use in segmentation of an image is determined by optimization of a modified energy function. The modified energy function is the energy function used in image segmentation with an additional term comprising a scalar value. The optimization is performed for different values of the scalar to produce multiple initial segmentations and one of these segmentations is selected based on pre-defined criteria. The training data is then used in segmenting the image. In other embodiments further methods are described: one places an ellipse inside the user-defined bounding box to define the background training data and another uses a comparison of properties of neighboring image elements, where one is outside the user-defined bounding box, to reduce the foreground training data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image labeling system for foreground/background image segmentation, the system described is provided as an example and not a limitation. As those skilled in the art will appreciate, the present examples are suitable for application in a variety of different types of image labeling systems and a non-exhaustive list of examples is: 3D reconstruction, stereo matching, object segmentation, object recognition and optical flow.

Figure 1:
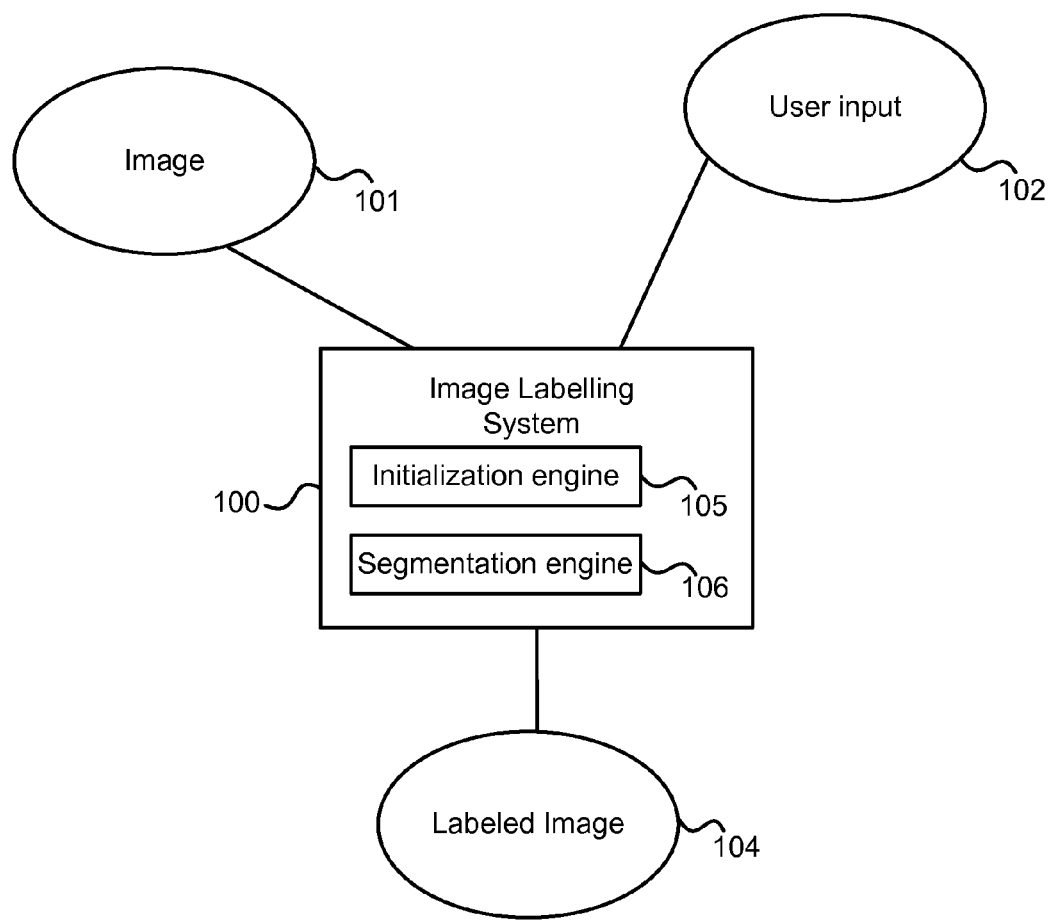
FIG. 1 is a schematic diagram of an image labeling system.

FIG. 1 is a schematic diagram of an image labeling system 100 implemented using a computer or processor of any suitable type. It is arranged to receive an image 101 as input and to provide as output a labeled version of that image 104 comprising, for each image element in the image or a part of the image, one of a specified plurality of possible labels. An image element may be a pixel, a group of pixels, a voxel or a group of voxels. The term "image" is used herein in a broad sense to include digital still images such as photographs, video stills, or other digital 2D images, medical images such as CT scans, MRI scans or other digital medical images, digital 3D images or higher dimensional images such as obtained from Z-cameras, voxel volumes, satellite imaging systems, ultra-sound scans, as well as sequences of images such as videos, or other captured or generated sequences of images.

Figure 4:
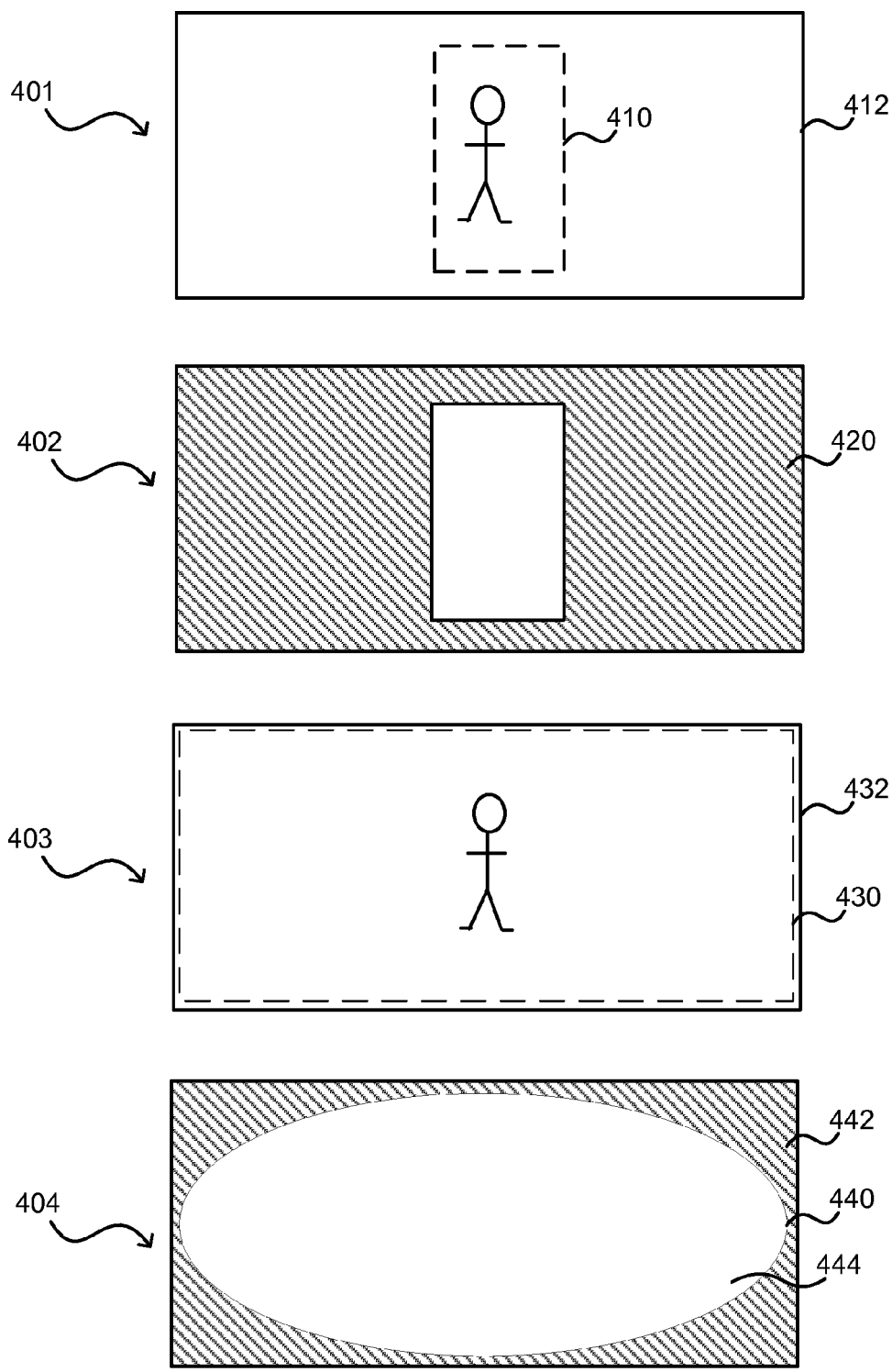
FIG. 4 shows graphical representations of the first example method.
Figure 13:
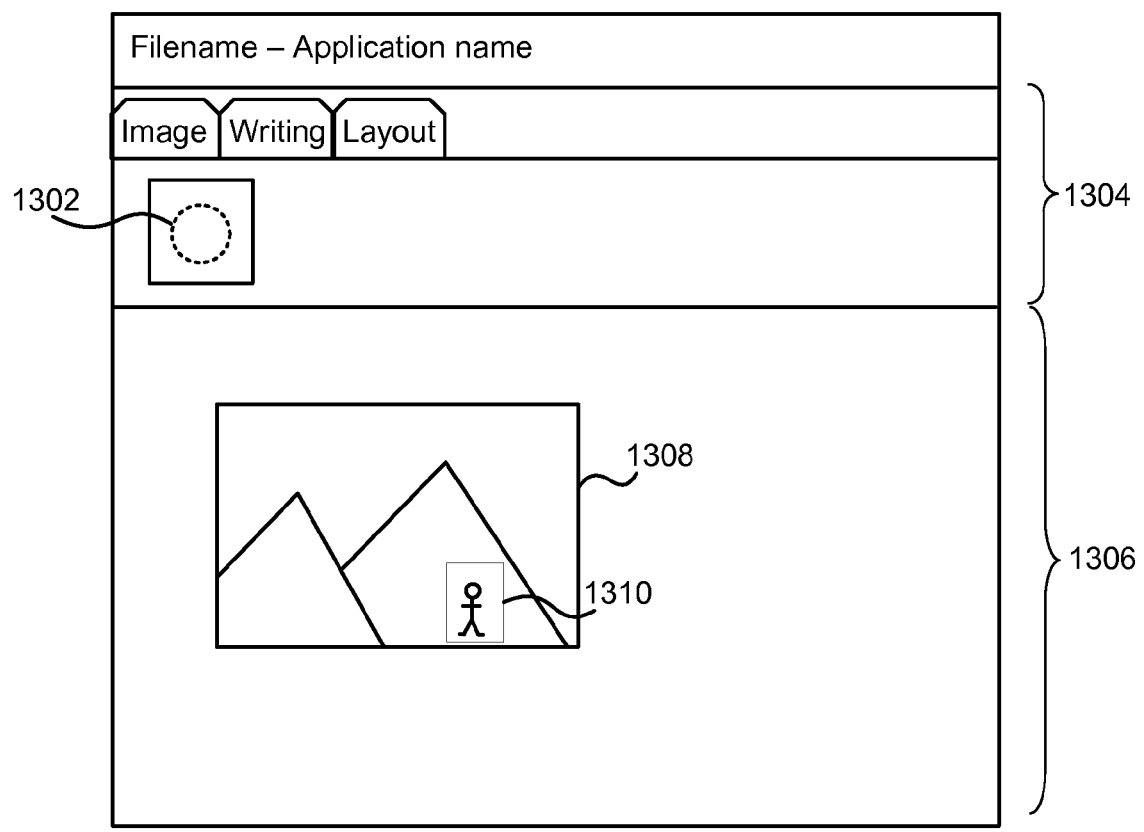
FIG. 13 is a schematic diagram of a user interface for performing image segmentation.

The image labeling system receives user input 102 specifying a region, which may be referred to as a bounding box, which contains (i.e. surrounds) an object for extraction by image segmentation (e.g. as shown in FIGS. 4 and 13). For example, where an image shows a ball (a foreground object)

on grass, a user may draw a box (or rectangle or other shape) on the image around the ball. The user input 102 is used in an initialization process in preparation for segmentation of the image. The initialization process defines the initial foreground and background training data which is used in performing the image segmentation. In the following description the user input is referred to as a defining a bounding box; however it will be appreciated that other shapes or regions may be used (e.g. ellipse, circle, irregular shapes etc).

The image labeling system 100 comprises an initialization engine 105 and a segmentation engine 106. The initialization engine 105 is arranged to use the user input 102 to define foreground and background training data for use in image segmentation by the segmentation engine 106. Although these engines are shown separately in FIG. 1, it will be appreciated that the initialization and segmentation may alternatively be implemented within a single engine (which may be the segmentation engine 106).

A number of methods of improving the initialization process for image segmentation are described below. These methods reduce the number of image elements which are assigned to the foreground/unknown region before image segmentation is performed and therefore reduce the amount of foreground training data (i.e. the number of image elements for which $\alpha=1$ after initialization, using the terminology described below). This may lead to improvements in the quality of the image segmentation results (e.g. improvements in the quality of labeled image 104) and therefore also improves the user experience.

The methods described may be used with any suitable method of performing the image segmentation and one example of a suitable method (referred to herein as 'Grab-Cut') is described in U.S. patent application Ser. No. 10/861,771 (Publication No. 2005/0271273) which is incorporated herein by reference in its entirety. A brief overview of an embodiment of GrabCut is provided below with reference to FIG. 2. The methods may also be used with other methods of image segmentation which involve optimization of an energy function and this energy function may take different forms dependent upon the type of image used.

Figure 2:
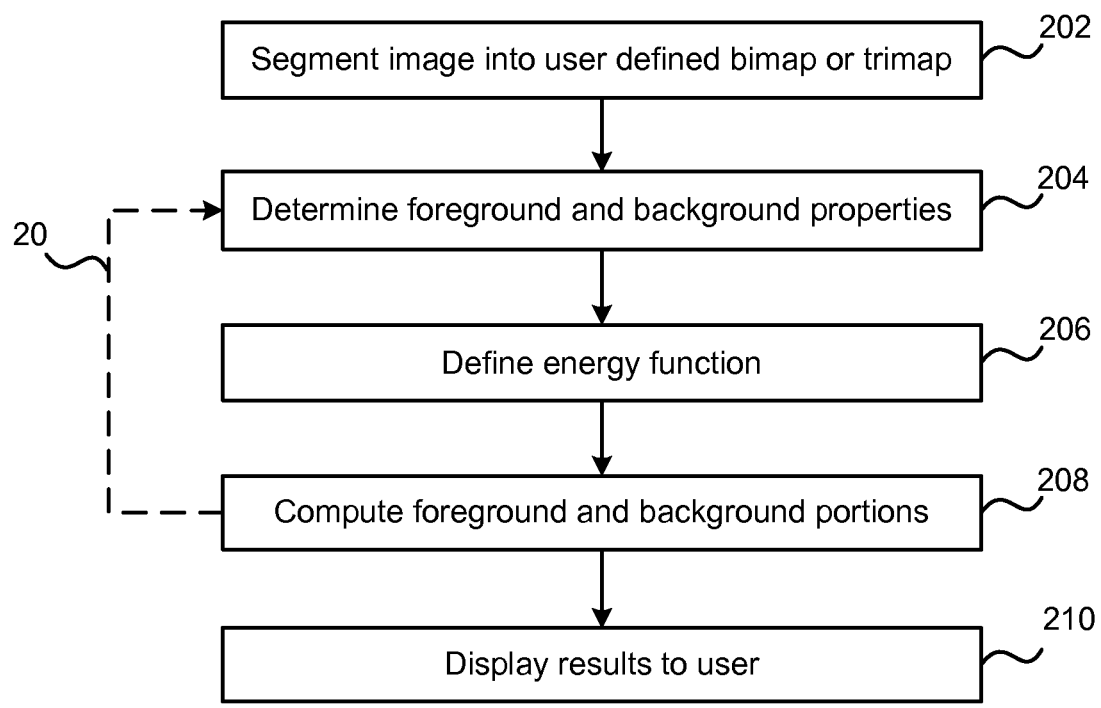
FIG. 2 is a flow diagram of an example method of image segmentation.

FIG. 2 is a flow diagram of an example method of image segmentation. This method uses graph cut applied to a user defined bimap or trimap to segment an image into foreground and background regions. The initialization process (block 202) comprises segmenting the image, which is considered to comprise pixels $z_n$ in color space, into a bimap or trimap based on user input (e.g. user input 102). The user defines, by way of the user input, at least a background region ($T_B$) and may also specify an unknown region ($T_U$) and/or a foreground region ($T_F$).

In an example, the user input may define a bounding box (or other shape) which contains the object to be extracted. In this example, the user input may result in a bimap/trimap comprising a background region which comprises all the image elements outside of the box. Alternatively, the background region may comprise those image elements in a small band (e.g. defined as a percentage of the size of the bounding box) around the bounding box.

Where the user defines only the background region, the foreground region is set to be the empty set ($T_F = \emptyset$) and the unknown region is set to be the complement of the background region ($T_U = \overline{T_B}$). A parameter an, which may be referred to as an opacity value, for each pixel is used to express the segmentation of the image and the opacity values are initialized as follows:

$\alpha_n=0$ for $n \in T_B$ $\alpha_n=1$ for $n \in T_U$

Gaussian mixture models (GMMs) may be used in defining the foreground and background properties (in block 204) and the foreground and background GMMs are initialized from sets $\alpha_n=0$ and $\alpha_n=1$ respectively. The initial sets $\alpha_n=0$ and $\alpha_n=1$ may be referred to as the background training data, (or background training region) and the foreground training data (or foreground training region) respectively. The training regions may, in some examples, not comprise a single contiguous group of image elements. Each GMM (one for the background and one for the foreground) is taken to be a full-covariance Gaussian mixture with K components (e.g. K=5). A vector $k=(k_1, \ldots, k_n)$ is used, with $k_n \in \{1, \ldots, K\}$ to assign a unique GMM component (one component either from the background or the foreground model) to each pixel according to the opacity value $\alpha_n$. For each pixel in the unknown region (i.e. for each n in $T_U$) GMM components are assigned using:

$$k_n := \arg\min_{k_n} D_n(\alpha_n, k_n, \underline{\theta}, z_n) \tag{1}$$

And then the GMM parameters are learnt from the data z using:

$$\underline{\theta} := \arg\min_{\underline{\theta}} U(\underline{\alpha}, k, \underline{\theta}, z) \tag{2}$$

The Gibbs energy for segmentation may be defined (in block 206) as:

$$E(\underline{\alpha}, k, \underline{\theta}, z) = U(\underline{\alpha}, k, \underline{\theta}, z) + V(\underline{\alpha}, z) \tag{3}$$

Where the parameter $\theta$ describes the image foreground and background distributions (as learned in block 204 using equation (2)), V is a smoothness term computed by Euclidean distance in color space, U is a data term which evaluates the fit of opacity distribution $\alpha$ to the data z, given the parameter $\theta$ and taking account of the color GMM models, where:

$$U(\underline{\alpha}, k, \underline{\theta}, z) := \Sigma D_n(\alpha_n, k_n, \underline{\theta}, z_n) \tag{4}$$

Where:

$D_n(\alpha_n, k_n, \underline{\theta}, z_n) = -\log p(z_n, k_n, \underline{\theta}) - \log \pi(\alpha_n, k_n)$ p( ) is a Gaussian probability distribution and π( ) are mixture weighting coefficients, so that (up to a constant):

$$D_n(\alpha_n, k_n, \underline{\theta}, z_n) = -\log\pi(\alpha_n, k_n) + \frac{1}{2}\log\det\sum(\alpha_n, k_n) + \frac{1}{2}[z_n - \mu(\alpha_n, k_n)]^T \sum(\alpha_n, k_n)^{-1}[z_n - \mu(\alpha_n, k_n)] \tag{5}$$

Therefore the parameters of the model are:

$$\underline{\theta} = \{\pi(\alpha, k), \mu(\alpha, k), \Sigma(\alpha, k), \alpha=0, 1, k=1 \ldots K\} \tag{6}$$

The smoothness term V is computed as follows, (where the contrast term is computed using Euclidean distance in the color space):

$$V(\underline{\alpha}, z) = \gamma \sum_{(m,n) \in C} [\alpha_n \neq \alpha_m] \exp -\beta \|z_m - z_n\|^2 \tag{7}$$

Where C is the set of pairs of neighboring pixels. When the constant β=0, the smoothness term is simply the well-known Ising prior, encouraging smoothness everywhere, to a degree determined by the constant γ. In an implementation, β may be greater than zero to relax the tendency to smoothness in regions of high contrast. The constant β may be chosen as:

$$\frac{1}{\beta} = 2\langle(z_m - z_n)^2\rangle$$

Where < > denotes expectation over an image sample. In an implementation, such a choice of β ensures that the exponential term in V (equation (7)) switches appropriately between high and low contrast.

Given the energy model described above, the foreground and background portions can be computed (in block 208) by using a standard minimum cut algorithm to solve:

$$\min_{\{\alpha_n: n \in T_U\}} \min_k E(\underline{\alpha}, k, \underline{\theta}, z) \qquad (8)$$

All pixels in the trimap region $T_B$ Bare assigned to background and all pixels in $T_F$ to foreground. Pixels in $T_U$ are assigned to either foreground or background, depending on the result of the energy minimization (equation (8)).

The process may be repeated, as indicated by the dotted arrow 20, in an iterative minimization process (or other optimization process) until convergence. Further processing may then be used, such as border matting (not shown in FIG. 2).

The results of the segmentation may be displayed to a user via a display device (block 210), e.g. by displaying the image with the foreground portion highlighted, by displaying only the foreground (or background) portion or by displaying the two portions as different layers within an image editing application or tool.

Figure 3:
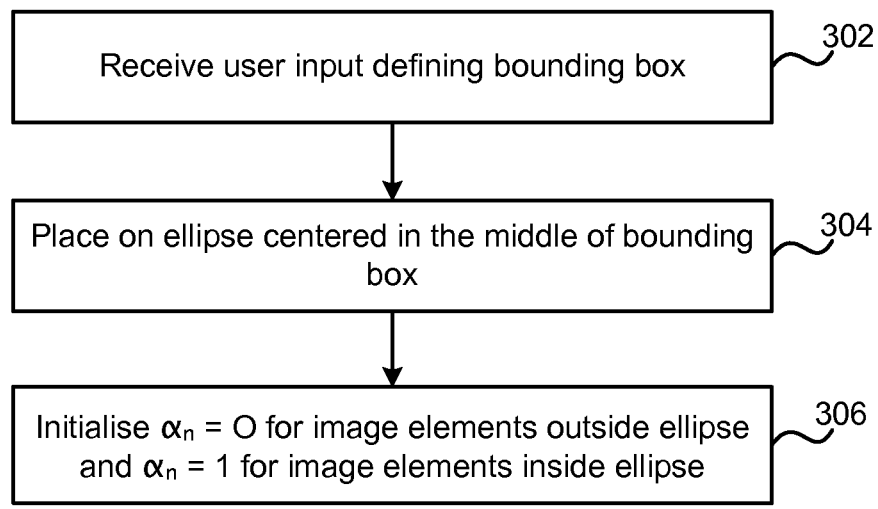
FIG. 3 is a flow diagram of a first example of an improved initialization method for image segmentation.

FIG. 3 is a flow diagram of a first example of an improved initialization method for image segmentation which can be described with reference to the graphical representations shown in FIG. 4. In most situations bounding box 410 drawn by the user is smaller than the image 412 and the background region is defined (e.g. in block 202 of FIG. 2) as the area 420 outside of the bounding box (as shown in example 402). However, in some situations, the user input (e.g. user input 102 in FIG. 1) defines a bounding box 430 which encompasses substantially the whole image 432 (as shown in the example 403). If standard initialization methods were applied in such a situation, there would be no background region (or only a small background region) and hence little or no background training data.

According to the method shown in FIG. 3, however, on receipt of an input defining a bounding box which is substantially the same size as the image (in block 302), an ellipse 440 (see example 404 in FIG. 4) is placed inside the user-defined bounding box 430 (block 304). The ellipse 440 is substantially centered on the middle of the bounding box 430 and substantially touches all four sides of the bounding box (in one example, the ellipse may exactly touch all four sides). This ellipse 440 is then used to define the training data (in block 306) such that image elements outside the ellipse (region 442) comprise the background training data (i.e. for this region $\alpha_n=0$) and image elements inside the ellipse (region 444) comprise the foreground training data (i.e. for this region $\alpha_n=1$).

The method shown in FIG. 3 may be used with GrabCut (e.g. instead of block 202 in FIG. 2) or other image segmentation methods. For example, where the image is monochrome (instead of color) the foreground and background properties may be defined in terms of histograms of gray values (or other monochrome scale) and this initialization technique may be used in combination with a segmentation method such as that described in the paper 'Interactive graph cuts for optimal boundary and region segmentation of objects in N-D images' by Boykov and Jolley (published in Proc. IEEE International Conference on Computer Vision 2001). Other features may be used instead of, or in combination with, gray-scale values, such as texture, blurriness etc.

The method shown in FIG. 3 may be used independently of the methods described below. However, the methods described below may also be used in combination with the method shown in FIG. 3.

Figure 5:
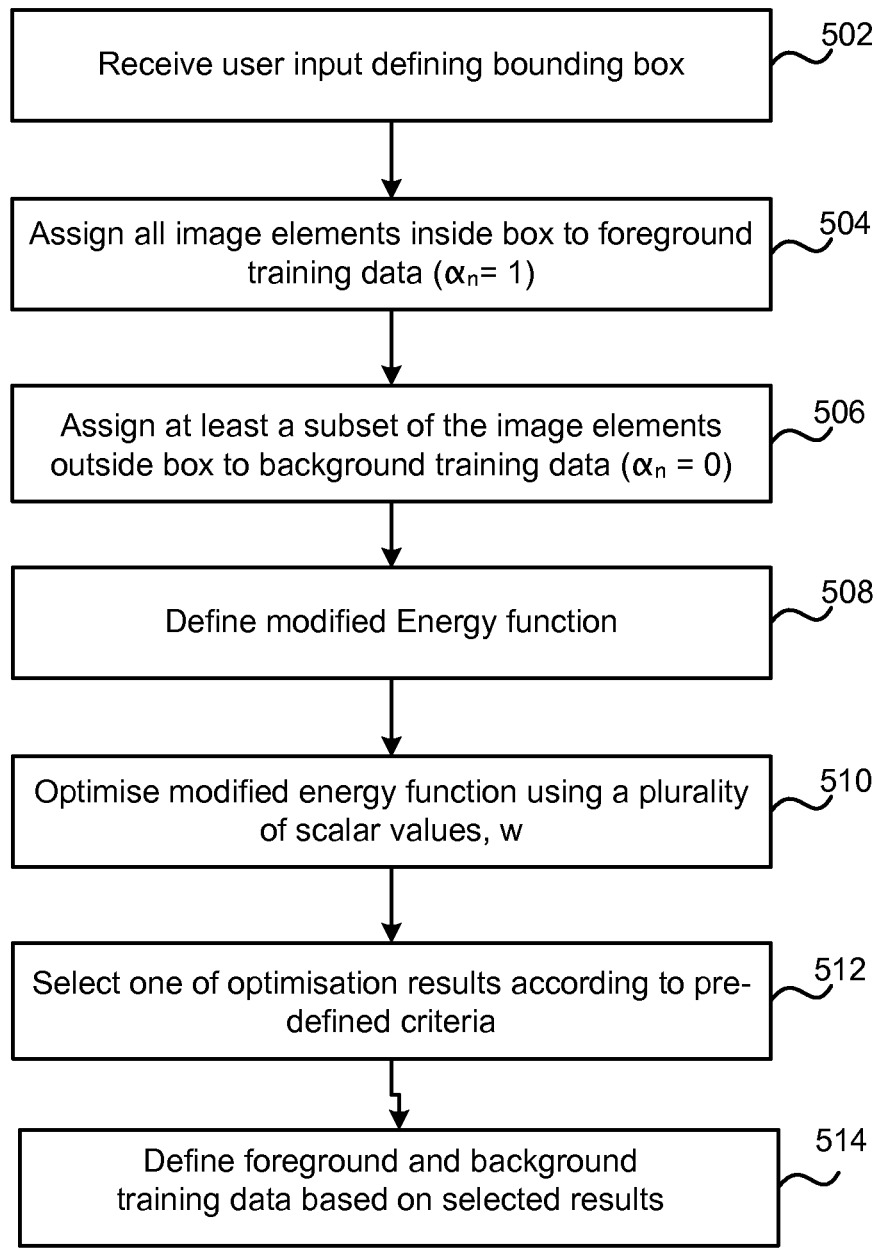
FIG. 5 is a flow diagram of a second example of an improved initialization method for image segmentation.

FIG. 5 is a flow diagram of a second example of an improved initialization method for image segmentation. The method comprises receiving a user input defining a bounding box (block 502) e.g. as shown in the first example 401 of FIG. 4. Initially, all image elements inside the bounding box are assigned to foreground training data (block 504), i.e. $\alpha_n=1$ and at least a subset of the image elements outside the bounding box are assigned to background training data (block 506), i.e. $\alpha_n=0$. As described above, in one embodiment all the image elements outside the bounding box may be considered background training data and in another embodiment, those image elements in a small band around the bounding box may be considered background training data.

The method also comprises defining a modified energy function (block 508). This modified energy function comprises the energy function which is used for image segmentation (i.e. after the initialization has been performed, e.g. in block 208 of FIG. 2) and an additional term comprising the product of a scalar value, w, and the opacity value $\alpha_n$ (or other combination of w and $\alpha_n$) summed over all image elements, n. If, for example, the GrabCut method is used for image segmentation, this modified energy function comprises equation (3) above plus the additional term $$\sum_n w\alpha_n,$$

as follows:

$$E(\underline{\alpha}, k, \underline{\theta}, z) = U(\underline{\alpha}, k, \underline{\theta}, z) + V(\underline{\alpha}, z) + \sum_n w\alpha_n \qquad (9)$$

As described above, V is a smoothness term computed by Euclidean distance in color space, U is a data term which evaluates the fit of opacity distribution α to the image data z.

If another method is used for image segmentation, such as the method for monochrome images proposed by Boykov and Jolley (as described in the paper referenced above), the modified energy function takes a different form, such as:

$$E(\underline{\alpha}, \underline{\theta}, z) = U(\underline{\alpha}, \underline{\theta}, z) + V(\underline{\alpha}, z) + \sum_n w\alpha_n \qquad (10)$$

In this equation V is a smoothness term and U is a data term which evaluates the fit of opacity distribution $\underline{\alpha}$ to the image data z given the parameters θ which describe image foreground and background grey-level distributions and comprises a histogram of grey levels for each of the foreground and background.

The method of FIG. 5 further comprises optimizing the modified energy function (e.g. as given by equation (9) or equation (10)) for a plurality of different values of the scalar value w (block 510). In performing the optimization, the background properties (e.g. the background color model if GrabCut is being used for image segmentation or the background histogram in the monochrome example) are computed from the background region (defined in block 506) and a uniform distribution is used for the foreground properties. A set (series) of solutions can be achieved by varying the variable w and running the optimization. Each optimization of the modified energy function results in a different segmentation of the image, i.e. a different labeling of image elements as either foreground ($\alpha=1$) or background ($\alpha=0$). Having run the optimization multiple times (in block 510) one set of results are selected (in block 512) and used to define the foreground and background training data (block 514). This foreground and background training data can then be used in computing the background and foreground properties (in block 204 of FIG. 2) which are then used in segmenting the image (e.g. in block 208 of FIG. 2).

The selection of one set of results (in block 512) may be made based on predefined criteria and in an embodiment, a segmentation (as computed by optimization of the modified energy function in block 510) may be selected which has the smallest area of foreground but where the distance of the largest connected foreground component of the segmentation to all four sides of the bounding box is smaller than a certain threshold. This can be explained with reference to FIG. 6.

Figure 6:
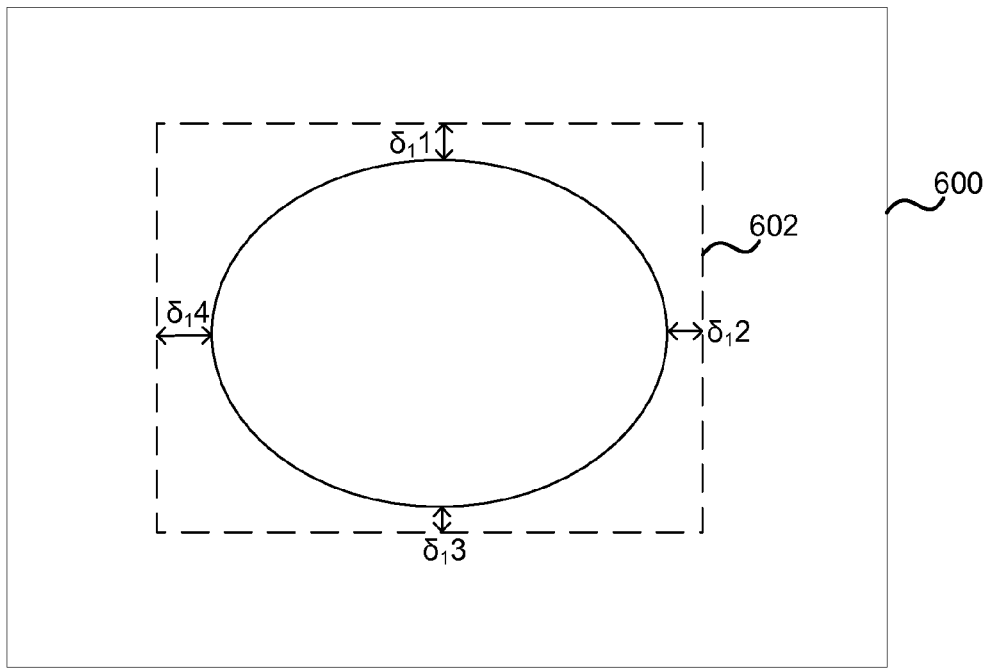
FIG. 6 shows a graphical representation of the optimization results using the method of FIG. 5.
Figure 6:
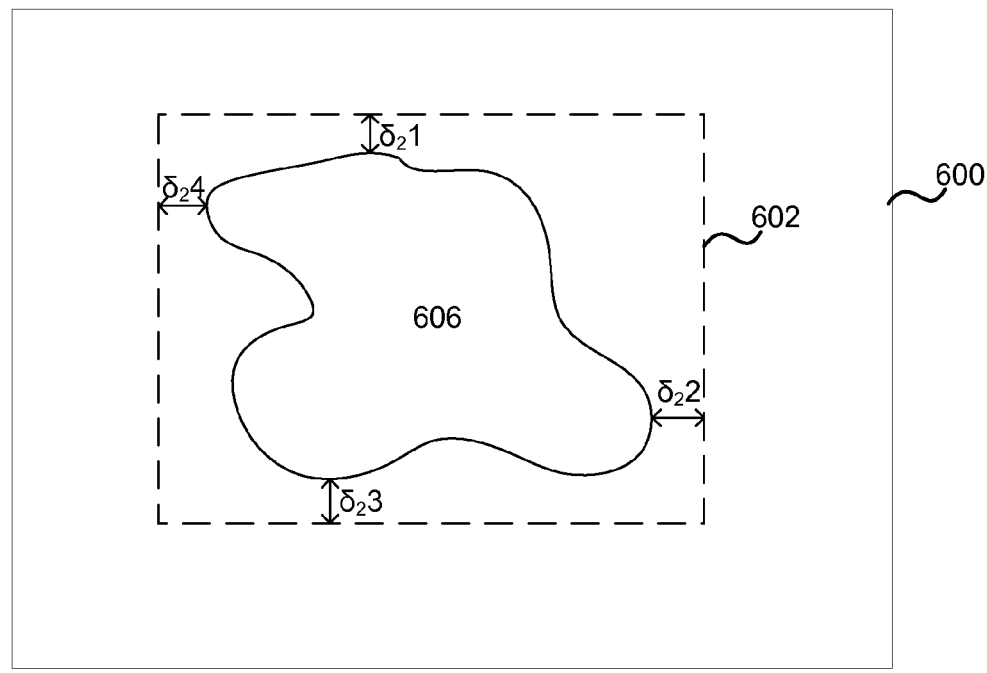

FIG. 6 shows a graphical representation of an image 600, a bounding box 602 and two examples of the foreground region 604, 606 computed by optimizing the modified energy function with different values of w (e.g. in block 510). The bounding box 602 is the same in both examples and in both examples the four distances marked by double ended arrows, $\delta_1 1$-$\delta_1 4$, $\delta_2 1$-$\delta_2 4$, are smaller than a defined threshold or thresholds. The second example 606 has the smaller area of foreground and would therefore be selected in preference to the first example 604.

The threshold(s) may be defined in a number of different ways, for example:

Each distance must not exceed a threshold $T_1$, i.e.:

$$\delta 1 < T_1 \text{ and } \delta 2 < T_1 \text{ and } \delta 3 < T_1 \text{ and } \delta 4 < T_1$$

The sum of the distances must not exceed a threshold $T_2$, i.e.:

$$(\delta 1 + \delta 2 + \delta 3 + \delta 4) < T_2$$

The sum of pairs of the distances must each not exceed thresholds $T_3$ and $T_4$, i.e.:

$$(\delta 1 + \delta 3) < T_3 \text{ and } (\delta 2 + \delta 4) < T_4$$

These thresholds may be defined in terms of absolute values, sizes of image elements (e.g. 30 pixels) or may be defined relative to the size of the bounding box. For example, $T_3$ may be set at 25% of the height of the bounding box and $T_4$ may be set at 25% of the width of the bounding box.

Other selection criteria may alternatively be used, for example another criteria which selects a segmentation with a foreground area which extends close to the sides of the bounding box. Such criteria are appropriate in situations where users place a bounding box which is not too loose, but is sufficiently tight around the object to be extracted through segmentation. Other criteria may be appropriate in other situations.

Although the above description refers to a bounding box, in other embodiments a different shape may be defined in block 502. In such an embodiment, the pre-defined criteria (used in block 512) are tailored to the particular shape of bounding region used.

In some embodiments, there may be a second criteria defined as part of the predefined criteria on which the selection is made (in block 512). Where the optimization process for various values of w is an iterative process (e.g. as shown in FIG. 7 and described below), a maximum number of iterations may be set (e.g. 100) to ensure that the iterative process will terminate.

Figure 7:
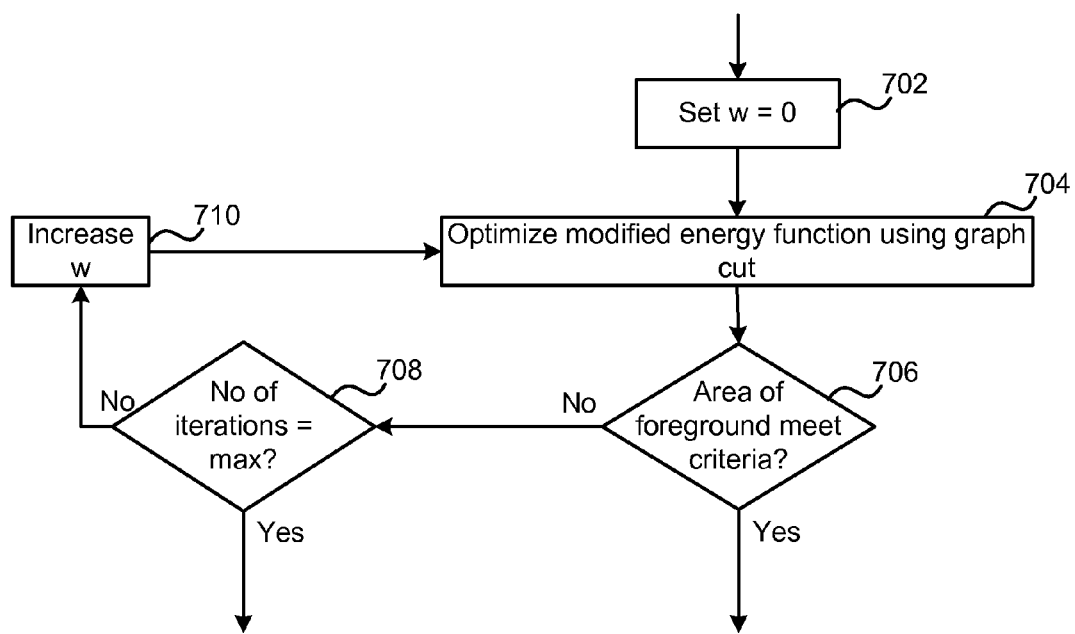
FIG. 7 shows a flow diagram an example method of performing some of the method steps of FIG. 5 in more detail.

FIG. 7 shows a flow diagram of an example method of performing the optimization and selection steps (blocks 510 and 512). In the example method, w is initially set to zero (block 702) and the modified energy function is then optimized using graph cut (block 704). In this first iteration with w=0, the modified energy function is the same as the energy function that will subsequently be used for image segmentation (e.g. in block 208 of FIG. 2); however at least the foreground properties used are different, because they are set to a uniform distribution and are not computed from any region of the image. In general, the background properties used are also different because they are computed from different background regions. The value of w is increased in value (in block 710) for subsequent iterations and in an example w may be increased in a defined step size, e.g. a step size of two. As w increases, the segmentation achieved by running graph cut (in block 704) has a larger foreground region (i.e. the number of image elements with label $\alpha=1$ increases).

The method shown in FIG. 7 terminates and the selection of a segmentation occurs when at least one of two criteria are satisfied (as determined in blocks 706 and 708). The first criterion (assessed in block 706) relates to the foreground region computed by optimizing the modified energy function (in block 704) and this may be specified as described above (e.g. with reference to FIG. 6). For example, this criterion is satisfied if the distance of largest connected foreground component from all four sides of the bounding box is smaller than one or more specified thresholds. The second criterion (assessed in block 708) sets a maximum number of iterations of the method (e.g. 100).

Although FIG. 7 shows the value of w being initially set to zero (in block 702) and increasing with each iteration (in block 710), in other examples, the initial value of w may be different and the value of w may vary in different ways (e.g. decrease) with each iteration. Where different energy functions are used for image segmentation, this iterative process of FIG. 7 may be adapted to be appropriate for the particular energy function used. Additionally, any step size used (in block 710) may be of fixed size or may be variable.

In another embodiment, parametric maxflow (e.g. as described in "Applications of parametric maxflow in computer vision" by V. Kolmogorov et al and published in ICCV, October 2007) may be used to optimize the modified energy function (e.g. as given in equation (9) above).

Figure 8:
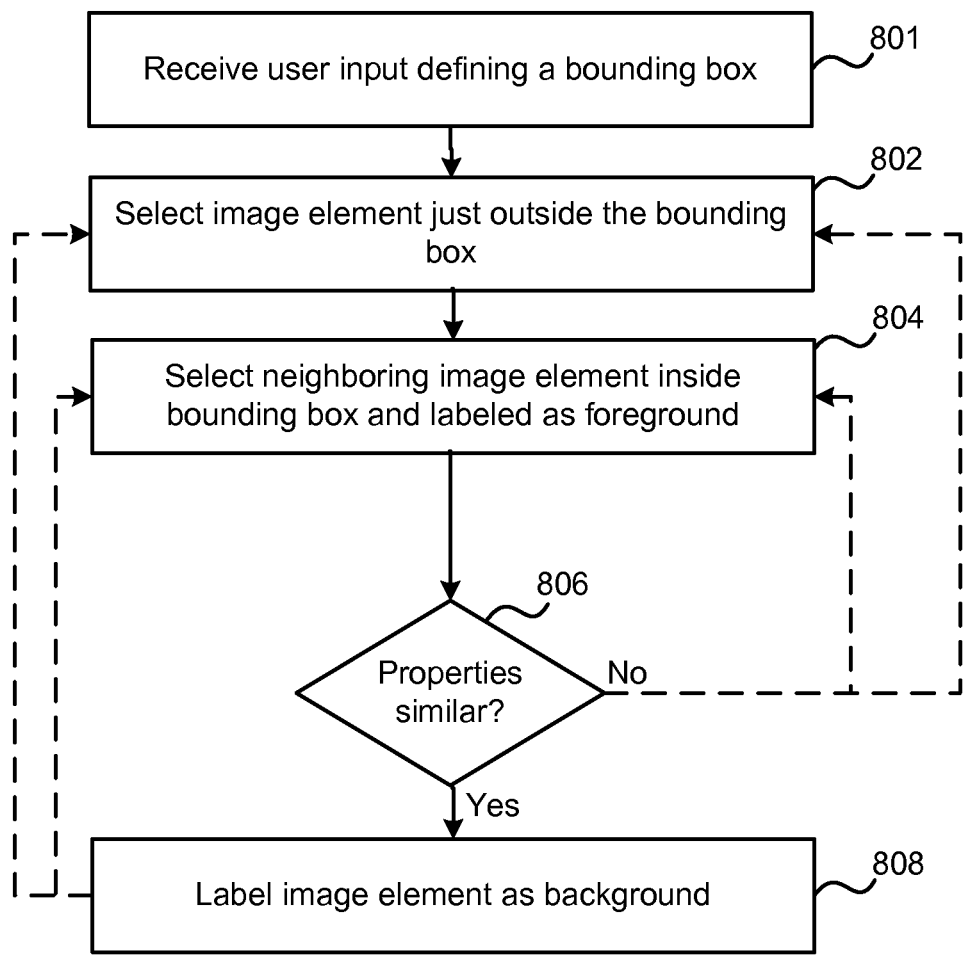
FIGS. 8 and 9 are flow diagrams of a third example of an improved initialization method for image segmentation.

A third example of an improved initialization method for image segmentation reduces the foreground training data on the basis that if two neighboring image elements have the same (or sufficiently similar) properties (e.g. the same color or gray-scale value) and one of the pair of image elements is outside the bounding box (and is therefore considered part of the background), there is a high probability that both image elements are background image elements. FIG. 8 is a flow diagram of an embodiment of this method. The method comprises receiving a user input defining a bounding box (block 801) and selecting an image element which is just outside the bounding box (block 802), i.e. an image element which is outside the bounding box which has a neighboring image element which is inside the bounding box. One such neighboring image element is then selected (block 804), i.e. a neighboring image element which is inside the bounding box and currently labeled as foreground ($\alpha=1$). If the properties (e.g. color) of the image elements are sufficiently similar ('Yes' in block 806), the selected neighboring image element is assigned a background label (block 808). The process is repeated for each neighbor of any image element which is changed from foreground to background (in block 808), for each neighbor of the image element selected in block 802 which is inside the bounding box and labeled as foreground and for each image element which is just outside the bounding box, as indicated by the dotted arrows in FIG. 8.

Figure 9:
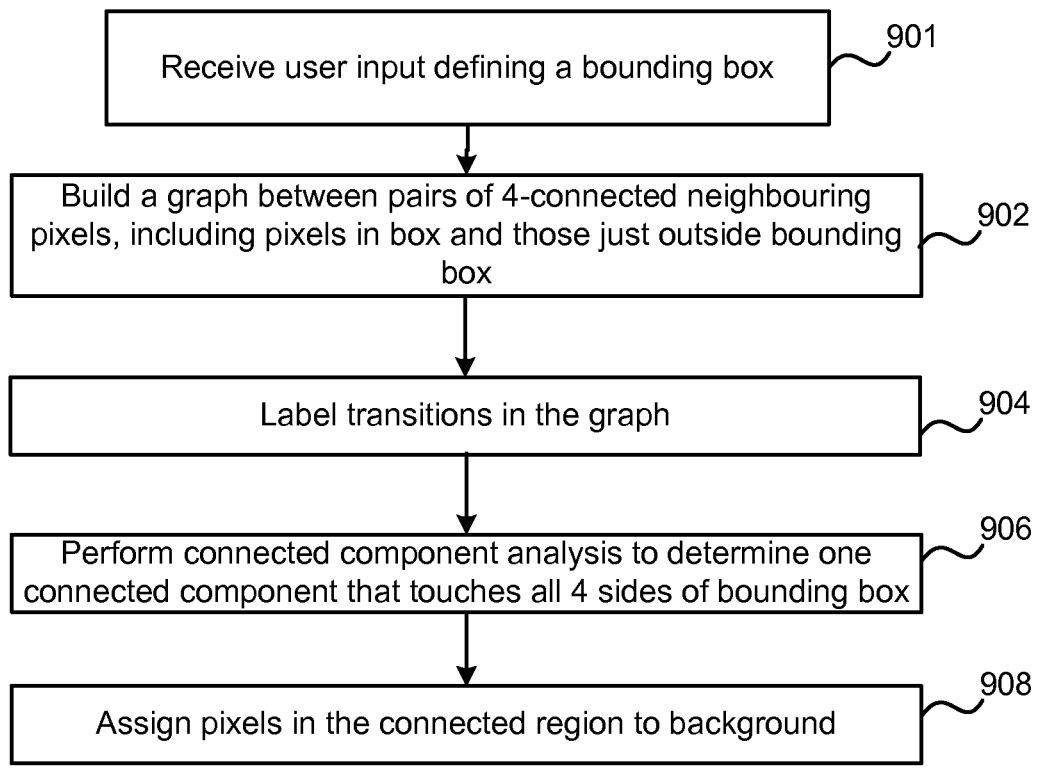

FIG. 9 shows a flow diagram of another example implementation of the third example method. This implementation comprises receiving a user input defining a bounding box (block 901) and then building a 4-connected graph between pairs of 4-connected neighboring image elements, including image elements inside the bounding box and image elements which are just outside the bounding box (block 902). Each pairwise transition is then labeled according to whether it is possible to transition between the image elements. This label corresponds to the assessment of similarity in FIG. 8 (block 806). For example, a label 0 may be assigned to a pairwise transition where it is not possible to transition (e.g. image elements are not sufficiently similar in terms of their properties) and a label of 1 may be assigned to pairwise transition where it is possible to transition (e.g. image elements are sufficiently similar in terms of their properties).

The labeling of the pairwise transitions may be implemented based on the properties of the background image elements, e.g. the underlying GMM which models the background distribution where GrabCut is used for image segmentation. Each image element 'i' is assigned to a Gaussian in this mixture model (which may, for example, comprise 10 Gaussians) and the index of the particular Gaussian to which is assigned may be denoted $g_i$. Each edge in the graph may be visited, where the indices of the two image elements in the edge are $g_i$ and $g_j$, and if $T(g_i, g_j)=1$, where $T(g_i, g_j)$ is the Gaussian transition matrix (which may be a 10×10 matrix), the edge is given the label 1. If $T(g_i, g_j) \neq 1$, the edge is given the label 0.

The Gaussian transition matrix may be determined according to the following pseudo-code:

```
m_i = MeanOfGaussian(g_i);
m_j = MeanOfGaussian(g_j);
likelihood_i = MinusLogProbablity(m_i);
likelihood_j = MinusLogProbablity(m_j);
if (min(likelihood_i, likelihood_j) > Threshold)
    T(g_i,g_j) = 0;
else
    T(g_i,gj) = 1;
end
```

The computation of $likelihood_i$ and $likelihood_j$ in the above pseudo-code corresponds to equation (5) above where $z_n = m_i$, $m_j$ respectively. The value of the threshold may, for example, be set to 30 or similar value.

Given the 4-connected pairwise graph (built in block 902), connected component analysis may be used to determine a connected component which touches all four sides of the bounding box (block 906). This connected component 1002 is shown graphically in FIG. 10 which also shows the bounding box 1004. Having completed the analysis, those image elements in the connected component (determined in block 906) are changed from foreground training data ($\alpha=1$) to background training data ($\alpha=0$).

Any suitable method of connected component analysis may be used (in block 906) and an example is as follows: all nodes in the graph are divided into three sets: active (A), processed (P), and not-processed (N). In the beginning all nodes are in set N, apart from those nodes which are just outside the bounding box (i.e. 4-connected to a pixel inside the bounding box) which are in set A. The first node in the active set A is visited and moved into the set P. Neighbors of the visited node are moved into set A if the edge to the neighbor is 1; otherwise the neighbor is not moved. This procedure is continued for the next node in the active set A and stops when set A is empty. The resultant connected component comprises those nodes in set P.

Figure 11:
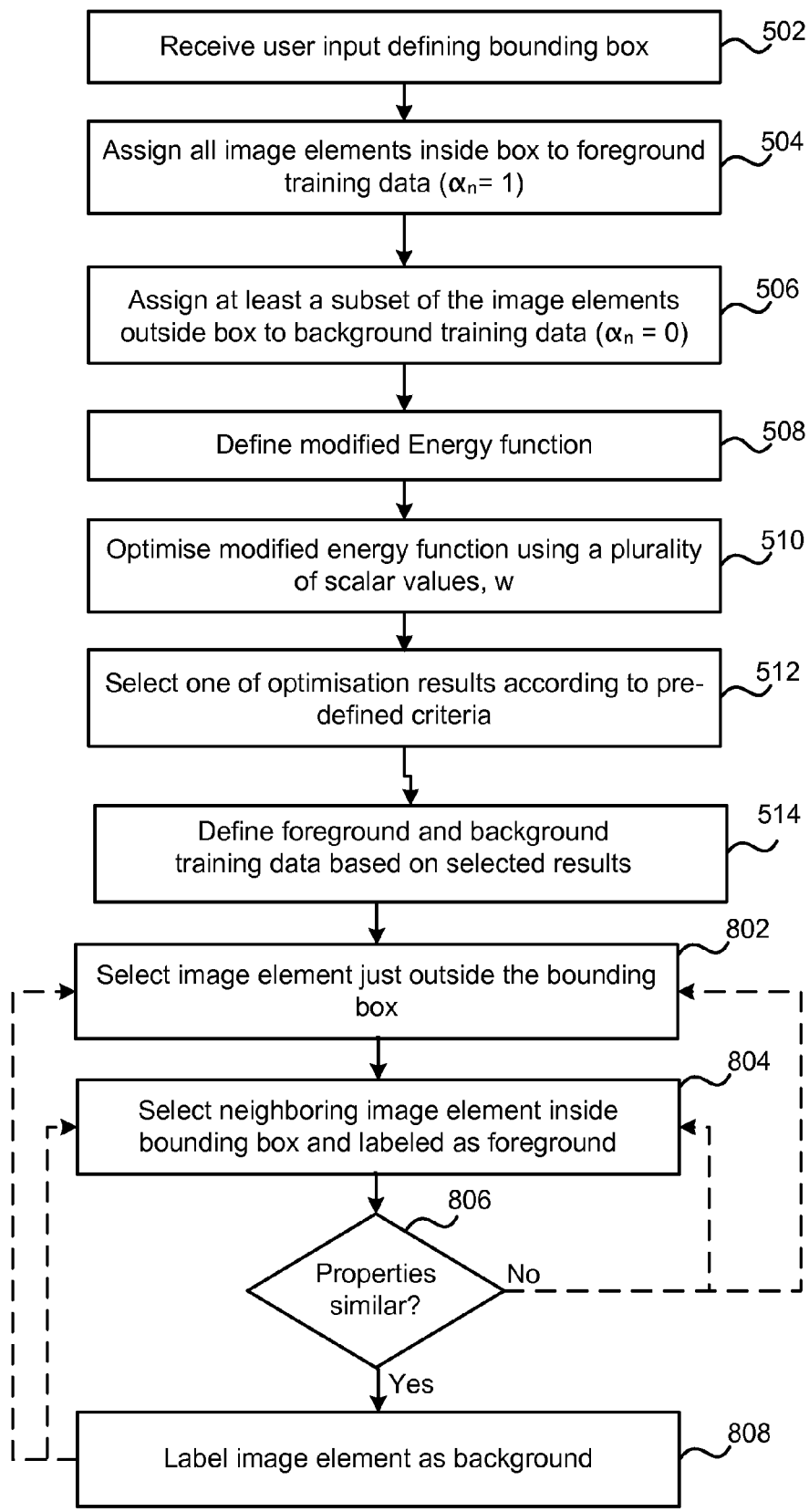
FIGS. 11 and 12 are flow diagrams of a further examples of improved initialization methods for image segmentation.
Figure 12:
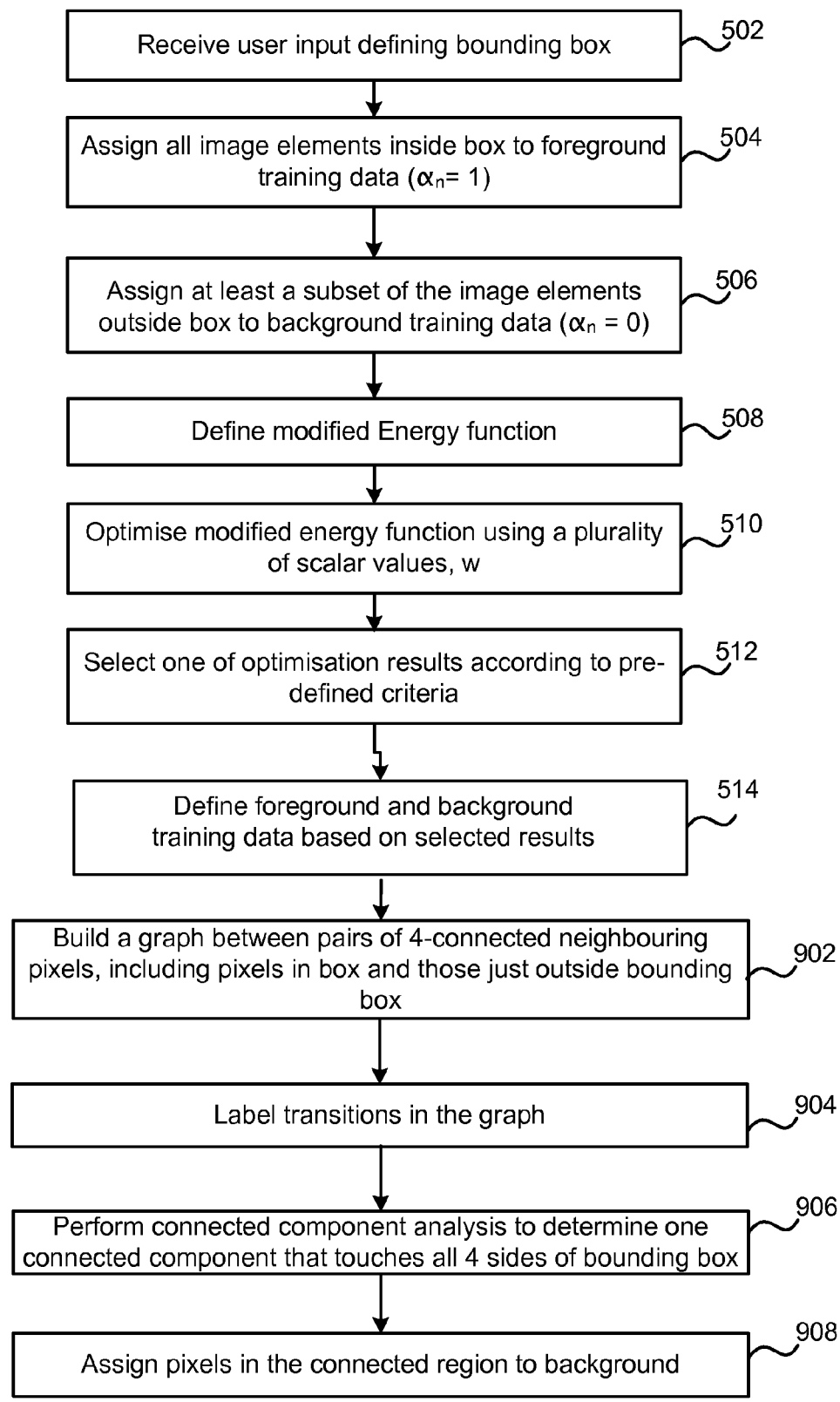

The methods shown in FIGS. 8 and 9 may be used independently or in combination with the method shown in FIG. 5, e.g. as shown in FIGS. 11 and 12. Where the methods are combined, the second part of the method may remove additional image elements from the foreground training data and add the image elements to the background training data, compared to the results of the first part of the method. Although FIGS. 11 and 12 show the method of FIG. 5 preceding the method of FIG. 8 or 9, in other examples, the method of FIG. 5 may be performed after the method of FIG. 8 or 9.

The methods described above may be implemented in an image editing tool within a software application. In an embodiment, the software application is an image editing application. In another embodiment, the software application is not a dedicated image editing application, but may instead be a word processing application, a spreadsheet application, a slide presentation application, a database application, an email application etc. Where a number of software applications are combined within a multiple functionality application, the image editing tool may be available within each application and may be presented to the user in the same or a similar manner in each application within the multiple functionality application. In an example, a dedicated control 1302 for image segmentation may be provided within a ribbon-shaped user interface 1304 above the software application workspace 1306, as shown in the schematic diagram of FIG. 13.

When a user clicks (e.g. with a mouse or other pointing device, which may include a finger if the display device is touch sensitive) on the dedicated control 1302, having selected an image 1308 which is displayed in the software application workspace 1306, one of the improved initialization methods described herein is performed followed by segmentation of the image (e.g. blocks 204-210 of FIG. 2). The image 1308 may, for example, have been pasted into a word processing document, a spreadsheet, an email, a database or a slide presentation.

User interaction may be provided (e.g. user input 102, as shown in FIG. 1) to define the bounding box 1310 or other region which is used in the initialization process and this user input may be provided before or after clicking on the dedicated control 1302. Other forms of user input may be used and the user input received may be interpreted in different ways in setting the initial background/foreground regions.

Figure 14:
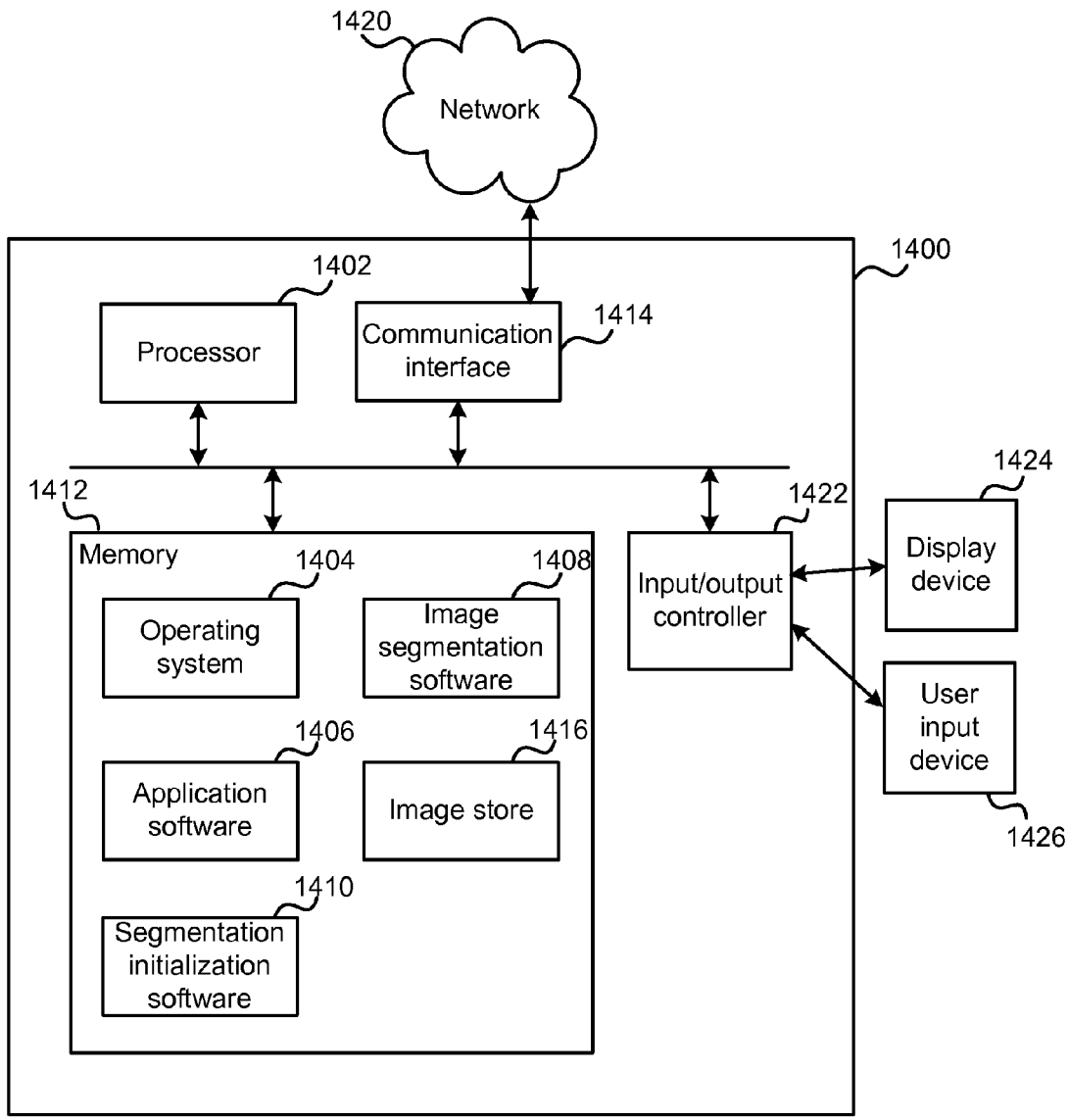
FIG. 14 illustrates an exemplary computing-based device in which embodiments of the methods described herein may be implemented.

FIG. 14 illustrates various components of an exemplary computing-based device 1400 which may be implemented as any form of a computing and/or electronic device, and in which embodiments of the methods described herein may be implemented.

Computing-based device 1400 comprises one or more processors 1402 which may be microprocessors, controllers or any other suitable type of processors for processing computing executable instructions to control the operation of the device in order to perform image segmentation, as described herein. Platform software comprising an operating system 1404 or any other suitable platform software may be provided at the computing-based device to enable application software 1406 to be executed on the device.

The application software 1406 may include software (i.e. executable instructions) for performing image segmentation or separate software 1408 may be provided. Where separate software is provided, this may be called by the application software 1406 or may be called directly by the user (e.g. as an image segmentation application). The image segmentation software may comprise software for performing the improved initialization methods described herein or separate software 1410 may be provided.

The computer executable instructions may be provided using any computer-readable media, such as memory 1412. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computing-based device 1400 it will be appreciated that the storage may be distributed or located remotely and accessed via a network or other communication link (e.g. using communication interface 1414). The memory 1412 may comprise an image store 1416 for storing the images which are segmented.

The communication interface 1414 is arranged to send/receive information over a network 1420. Any suitable network technology (including wired and wireless technologies) and network protocol(s) may be used.

Figure 10:
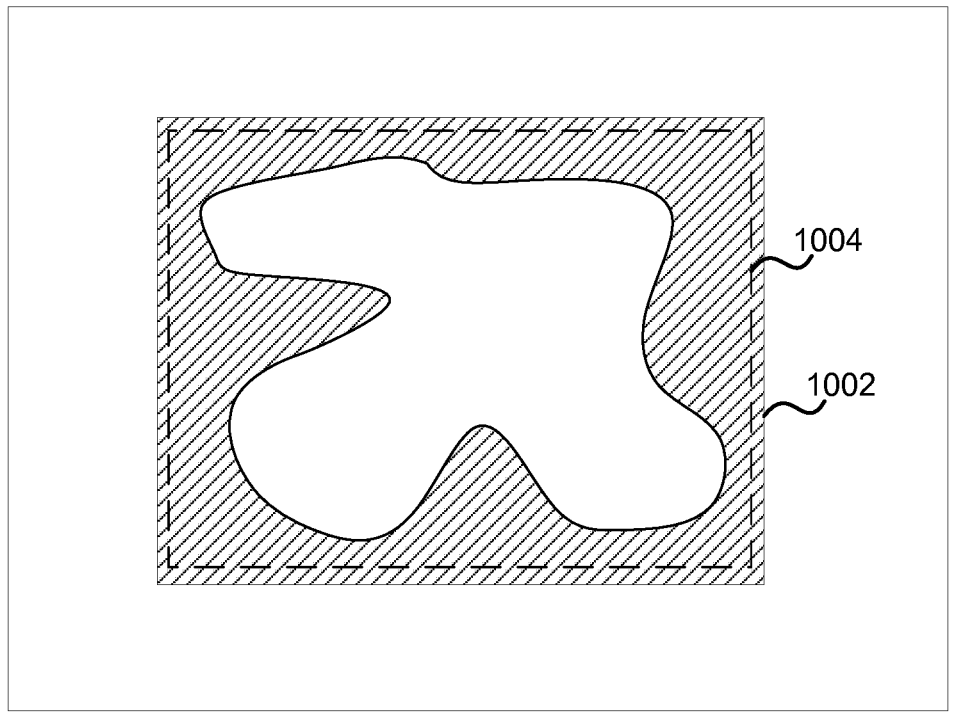
FIG. 10 shows a graphical representation of the results of the method of FIG. 9.

The computing-based device 1400 also comprises an input/output controller 1422 arranged to output display information to a display device 1424 which may be separate from or integral to the computing-based device 1400. The display information may provide a graphical user interface and may be arranged to display the initial image (e.g. as shown in FIG. 13) and/or the results of the image segmentation to the user. The input/output controller 1422 is also arranged to receive and process input from one or more devices, such as a user input device 1426 (e.g. a mouse or a keyboard). This user input may be the user input which is used to define the bounding box (e.g. user input 102 in FIG. 1, or as received in block 302 in FIG. 3, block 502 in FIGS. 5, 11 and 12, block 801 in FIG. 8, block 901 in FIG. 9 or as shown in FIGS. 4, 6 and 10). In an embodiment the display device 1424 may also act as the user input device 1426 if it is a touch sensitive display device. The input/output controller 1422 may also output data to devices other than the display device, e.g. a locally connected printing device (not shown in FIG. 14).

Although the present examples are described and illustrated herein as being implemented in the system shown in FIG. 14, the system described is provided as an example and not a limitation. As those skilled in the art will appreciate, the present examples are suitable for application in a variety of different types of computing systems.

Furthermore, although the improved initialization methods are described with reference to the GrabCut method of image segmentation, the methods may be used with other methods of image segmentation, including other methods of image segmentation which involve optimization of an energy function.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of segmenting an image into foreground and background portions, the method comprising:
    determining a foreground training region and a background training region of the image;
    determining foreground and background properties based on said foreground and background training regions; and
    computing foreground and background portions of the image by optimizing a first energy function,
    wherein the first energy function comprises a function of the foreground and background properties, and
    wherein the step of determining a foreground training region and a background training region of the image comprises:
        receiving, at a computer, a user input defining a region of the image;
        on the basis of the user input, segmenting the image into a first portion comprising image elements having a foreground label and a second portion of image elements having a background label, wherein the foreground label comprises a segmentation parameter which has a first value and the background label comprises a segmentation parameter which has a second value;
        defining a second energy function comprising a combination of the first energy function and an additional term, the additional term comprising a combination of a scalar value and the segmentation parameter for an image element, summed over a plurality of image elements;
        optimizing the second energy function using a plurality of different values of the scalar value to produce a plurality of optimization results, each optimization result defining a candidate foreground training region and a candidate background training region; and
        selecting one of the plurality of optimization results to provide the foreground and background training regions.

2. A method according to claim 1, wherein selecting one of the plurality of optimization results to provide the foreground and background training regions comprises:
    selecting an optimization result with the smallest candidate foreground region which satisfies a condition that a distance of a largest connected component within the candidate foreground region to each side of the user-defined region is smaller than a defined threshold.

3. A method according to claim 2, wherein the defined threshold is defined with reference to at least one dimension of the user-defined region.

4. A method according to claim 2, wherein optimizing the second energy function using a plurality of different values of the scalar value to produce a plurality of optimization results comprises:
    iteratively optimizing the second energy function using increasing values of the scalar value until the optimization result produced satisfies the selection condition.

5. A method according to claim 1, wherein optimizing the second energy function using a plurality of different values of the scalar value to produce a plurality of optimization results comprises:
    determining initial background properties based on said second portion;
    setting initial foreground properties to a uniform distribution; and
    optimizing the second energy function using the initial background properties, the initial foreground properties and a plurality of different values of the scalar value.

6. A method according to claim 1, wherein computing foreground and background portions of the image by optimizing a first energy function uses an iterative optimization process.

7. A method according to claim 1, wherein the second energy function is $$E(\alpha, k, \theta, z) = U(\alpha, k, \theta, z) + V(\alpha, z) + \sum_n w\alpha_n,$$

where w is the scalar value, $\alpha_n$ is the segmentation parameter for image element n, z is image data, V is a smoothness term and U is a data term which evaluates the fit of a segmentation parameter distribution $\alpha$ to the image data z.

8. A method according to claim 1, further comprising:
    displaying, on a display device, at least one of the foreground and background portions of the image.

9. A method according to claim 1, wherein the step of determining a foreground training region and a background training region of the image further comprises:
    assigning a background label to at least a subset of image elements outside the user-defined region;
    for an image element in the user-defined region which has a neighbor image element assigned a background label, assigning a background label to the image element if a difference in properties associated with the image element and the neighbor image element is less than a threshold;
    and wherein the step of selecting one of the plurality of optimization results to provide the foreground and background training regions comprises:
        selecting one of the plurality of optimization results comprising a candidate foreground training region and a candidate background training region; and
        identifying image elements in the candidate foreground training region assigned a background label; and
    assigning the identified image elements to the candidate background training region instead of the candidate foreground training region to provide the foreground and background training regions.

10. A method according to claim 1, wherein the step of segmenting the image into a first portion comprising image elements having a foreground label and a second portion of image elements having a background label on the basis of the user input comprises, if the user-defined region comprises substantially all of the image:
    defining an elliptical region inside the user-defined region, the elliptical region substantially touching each side of the user-defined region, wherein the first portion comprises image elements inside the elliptical region and the second portion comprises image elements outside the elliptical region.

11. A method according to claim 1, implemented in an image editing tool in a software application.

12. A method according to claim 1, wherein the software application comprises one of a word processing application, a spreadsheet application, a slide presentation application, a database application and an email application.

13. A computer-implemented method of segmenting an image into foreground and background portions, the method comprising:
- determining a foreground training region and a background training region of the image;
- determining foreground and background properties based on said foreground and background training regions; and
- computing foreground and background portions of the image by optimizing a first energy function,
- wherein the first energy function comprises a function of the foreground and background properties, and
- wherein the step of determining a foreground training region and a background training region of the image comprises:
  - receiving, at a computer, a user input defining a region of the image;
  - assigning a background label to at least a subset of image elements outside the user-defined region;
  - assigning a background label to an image element in the user-defined region which has a neighbor image element assigned a background label if a difference in properties associated with the image element and the neighbor image element is less than a defined threshold;
  - defining the background training region as those image elements assigned a background label and defining the foreground training region as other image elements within the user-defined region.

14. A method according to claim 13, wherein assigning a background label to an image element in the user-defined region which has a neighbor image element assigned a background label if a difference in properties associated with the image element and the neighbor image element is less than a defined threshold comprises:
- defining a set of image elements comprising image elements in the user-defined region and image elements outside the user-defined region having a neighbor image element inside the user-defined region;
- building a graph between neighboring pairs of image elements within the defined set of image elements;
- assigning a label to each edge in the graph dependent upon whether a difference in properties associated with image elements connected by the edge is less than a defined threshold;
- analyzing the graph and the labeled edges to compute a connected component which touches each side of the user-defined region; and
- assigning a background label to image elements within the connected component.

15. A method according to claim 13, further comprising:
- displaying, on a display device, at least one of the foreground and background portions of the image.

16. A method according to claim 13, implemented in an image editing tool in a software application.

17. One or more tangible device-readable storage media with device-executable instructions that, when executed by a computing system, direct the computing system to perform steps comprising:
- displaying, on a display device, an image to a user;
- receiving a user input defining a region of the image;
- on the basis of the user input, determining a foreground training region and a background training region of the image;
- determining foreground and background properties based on said foreground and background training regions;
- computing foreground and background portions of the image by iteratively optimizing a first energy function, wherein the first energy function comprises a function of the foreground and background properties; and
- displaying, on a display device, at least one of the foreground and background portions of the image,
- wherein the step of determining a foreground training region and a background training region of the image comprises:
  - on the basis of the user input, segmenting the image into a first portion comprising image elements having a first opacity value and a second portion of image elements having a second opacity value;
  - defining a second energy function comprising the first energy function and an additional term, the additional term comprising a product of a scalar and an opacity value for an image element, summed over all image elements;
  - iteratively optimizing the second energy function using increasing values of the scalar to produce an optimization result defining a candidate foreground training region and a candidate background training region which satisfy predefined criteria;
  - using said optimization result to provide the foreground and background training regions.

18. One or more tangible device-readable storage media according to claim 17, wherein the second energy function is $$E(\alpha, k, \theta, z) = U(\alpha, k, \theta, z) + V(\alpha, z) + \sum_n w\alpha_n,$$

where w is the scalar value, $\alpha_n$ is the opacity value for image element n, z is image data, V is a smoothness term and U is a data term which evaluates the fit of an opacity distribution $\underline{\alpha}$ to the image data $\underline{z}$.

19. One or more tangible device-readable storage media according to claim 17, wherein using said optimization result to provide the foreground and background training regions comprises:
- assigning a background label to at least a subset of image elements outside the user-defined region;
- for each image element in the user-defined region which has a neighbor image element assigned a background label, assigning a background label to the image element if a difference in properties associated with the image element and the neighbor image element is less than a threshold; and
- defining a background training region comprising image elements in the candidate background training region and image elements in the candidate foreground training region assigned a background label; and
- defining a foreground training region comprising image elements in the candidate foreground region not assigned a background label.

20. One or more tangible device-readable storage media according to claim 17, wherein the step of segmenting the image into a first portion comprising image elements having a first opacity value and a second portion of image elements having a second opacity value, if the user-defined region comprises substantially all of the image:

defining an elliptical region inside the user-defined region, the elliptical region substantially touching each side of the user-defined region, wherein the first portion comprises image elements inside the elliptical region and the second portion comprises image elements outside the elliptical region.

* * * * *